United States Patent [19]

Wissmath

[11] Patent Number: 4,596,287

[45] Date of Patent: Jun. 24, 1986

[54] FLOW DISTRIBUTOR FOR A HEAT EXCHANGER

[75] Inventor: Siegfried Wissmath, Rehau, Fed. Rep. of Germany

[73] Assignee: REHAU Plastiks AG & Co., Rehau, Fed. Rep. of Germany

[21] Appl. No.: 548,012

[22] Filed: Nov. 1, 1983

[30] Foreign Application Priority Data

Nov. 12, 1982 [DE] Fed. Rep. of Germany ....... 3241842

[51] Int. Cl.⁴ .............................................. F28F 9/02
[52] U.S. Cl. .................................... 165/174; 165/166
[58] Field of Search ................ 165/173, 174, 166, 170

[56] References Cited

U.S. PATENT DOCUMENTS

| | | | |
|---|---|---|---|
| 1,662,236 | 3/1928 | Coupland | 165/174 |
| 2,263,074 | 11/1941 | Dunham et al. | 165/174 X |
| 2,602,647 | 7/1952 | Miller | 165/174 X |
| 3,527,832 | 9/1970 | Pamphilis et al. | 165/174 |
| 4,114,597 | 9/1978 | Erb | 165/170 X |
| 4,473,066 | 9/1984 | Clark | 165/170 X |

FOREIGN PATENT DOCUMENTS

| | | | |
|---|---|---|---|
| 434907 | 9/1935 | United Kingdom | 165/174 |
| 1388125 | 3/1975 | United Kingdom | 165/170 |

*Primary Examiner*—Albert W. Davis, Jr.
*Assistant Examiner*—Peggy Neils
*Attorney, Agent, or Firm*—Spencer & Frank

[57] ABSTRACT

A heat exchanger assembly comprises a plate-shaped heat exchanger having a plurality of flow channels each having an inlet end through which heat transferring fluid is introduced for passing through the flow channels in a flow direction and an inlet chamber into which the inlet ends of the flow channels open. The heat exchanger assembly further has a flow distributing flat nozzle situated in the inlet chamber of the heat exchanger. The nozzle has an outlet end oriented towards the flow channels and directly connected with the inlet end of the flow channels and an inlet nipple defining a tubular conduit. The flat nozzle defines a distributor chamber which is in communication with the tubular conduit and with the outlet end.

2 Claims, 5 Drawing Figures

FLOW DISTRIBUTOR FOR A HEAT EXCHANGER

BACKGROUND OF THE INVENTION

This invention relates to a plate-shaped heat exchanger generally made of plastic and having a plurality of longitudinally extending flow channels which are separated from one another by longitudinally extending webs. The channels guide a heat transferring fluid. The opposite ends of the flow channels merge into collecting conduits which contain fluid inlet and fluid outlet ports.

Plate-shaped heat exchangers are known which are formed of two plates connected with one another by means of an arbitrary number of parallel-extending webs. In this manner a plurality of parallel-oriented flow channels for the heat transferring fluid is provided.

For forming fluid inlet and fluid outlet openings, the plates of known plate-shaped heat exchangers of the above type may be connected to one another at the free ends of the flow channels. For this purpose, the transverse webs between the two plates may be cut to appropriate lengths or may be omitted and the ends of the two plates may be sealingly connected with one another by applying heat and pressure and/or by interposing an adhesive.

The known plate-shaped heat exchangers are disadvantageous in that in the zone of the intended inflow the heat transferring fluid passes relatively rapidly through the associated flow channels while the peripherally arranged flow channels are charged with the heat transferring fluid with a delay. Thus, a trailing of the fluid occurs in the peripheral channels which adversely affects a uniform heat transfer. This disadvantage is particularly pronounced in cases where the known plate-shaped heat exchangers are used in heating systems for floors, walls or ceilings.

In order to attempt to remedy the above disadvantage, it has been known to provide a distributor pipe into which the individual flow channels merge and which is arranged unilaterally or bilaterally over the entire width of the heat exchanger plate. The distributor pipe may have a central inlet and a central outlet which may be expedient in a construction in which the introduction of the heat transferring fluid occurs on one plate side and the withdrawal of the heat transferring fluid is effected on the other plate side. There are further structures conceivable in which the introduction and the removal of the fluid is effected only at one transversal side of the heat exchanger. In such cases the deflection of the fluid is effected within the heat exchanger at the transverse end remote from the location of the introduction of the fluid. For this purpose, the heat exchanger plate is provided, approximately centrally and in the longitudinal direction, with a blocking web which divides the unilaterally arranged distributor pipe into an inflow part and an outflow part. At the opposite end of the heat exchanger plate the web has a recessed end which permits a transition of the fluid from the inflow plate side to the return plate side.

In case of a known central inflow in the heat exchanger plate, the disadvantageous characteristics of leading flow in the flow channels charged more or less directly and the trailing flow in the peripheral channels also exist.

It has been attempted to eliminate the disadvantage of leading and trailing flows by designing the flow channels with different cross-sectional areas. This measure results in a certain reduction of the above-discussed non-uniformity of the flow characteristics in the individual flow channels but, on the other hand, creates problems as concerns the pressure-stresses on the heat exchanger plate. It has to be noted in this connection that the heat exchanger plate, if used in heating systems for floors has to take up significant weight-supporting loads without an appreciable reduction of the flow passage area of the individual flow channels. Such an undesired reduction, however, occurs precisely when, for example, the cross-sectional dimensions of the flow channels increase from the middle of the plate towards the periphery thereof, assuming a central charging of the heat exchanger plate. Such a plate would be in the peripheral zone less resistant against loads than in its central zone; such differences, however, cannot be permitted in heat exchangers for the intended application.

SUMMARY OF THE INVENTION

It is an object of the invention to provide an improved plate-shaped heat exchanger which is provided centrally and in the peripheral regions with flow channels of identical cross section and from which the disadvantages of leading and trailing flows of the heat transferring fluid in the central and peripheral regions are eliminated.

This object and others to become apparent as the specification progresses, are accomplished by the invention, according to which, briefly stated, there is provided a flow distributing flat nozzle which is situated in an inlet chamber of the plate-shaped heat exchanger. The flat nozzle has an outlet end oriented towards flow channels of the heat exchanger and is directly connected with the inlet end of the flow channels. The flat nozzle further has an inlet nipple defining a tubular conduit. The flat nozzle defines a distributor chamber which is in communication with the tubular conduit and the nozzle outlet.

It is an advantage of the flat nozzle according to the invention that the inner space thereof constitutes a distributor channel which, as a function of its length, may directly charge the individual flow channels of the heat exchanger with the heat transferring fluid. The flat nozzle may be installed in the free ends of the heat exchanger plate and may be connected fluidtight with the edges of the plate ends by welding, gluing, etc. The flat nozzle (flow distributor) according to the invention is advantageously installed in an axial orientation to the flow direction in the flow channels at the ends of the heat exchanger plate. In this manner, pressure losses upon deflection, such as generated in the fluid, for example, in case of a radial supply opening, are, for practical purposes, entirely eliminated. In case of a heat exchanger plate in which the fluid flows only in one direction, the flat nozzle according to the invention may be used as an inflow element, as well as an outflow element. In the centrally divided heat exchanger plate for the intake and, respectively, for the outlet of fluid, a first flat nozzle according to the invention may be used as an intake at the inflow side of the heat exchanger plate and a second flat nozzle may be used in the same plane at the outlet side of the heat exchanger plate. In such a structure the two end zones of the flat nozzles oriented to one another may be connected with the central separator web.

Dependent upon the mode of use—for example, as a part of a heating system for floors—it has been found expedient to form the inner space of the flat nozzle by a planar upper cover and a downwardly bulging bottom part whose free ends extend upwardly to the cover part and are sealingly connected with the free ends of the cover part. A nozzle according to the invention structured in this manner may find particularly advantageous use as a heat exchanger plate for heating systems for floors. The planar upper cover part prevents the formation of bulges on the face exposed to loads. Such bulges should be taken into account if, for example, instead of the flat nozzle according to the invention, a distributor pipe is used at the transverse ends of the heat exchanger plate. It is thus of importance—and such a requirement is fulfilled by the flat nozzle according to the invention—that the heat exchanger plate is entirely planar on its side oriented towards the loading forces. The flat nozzle according to the invention may be structured such that the cover part is connected in a fluidtight manner with the bottom part and the tubular connecting part so that in the inside of the flat nozzle a distributor channel is formed which communicates, on the one hand, with the inside of the tubular connecting member and, on the other hand, with the wide flow opening leading to the flow channels. The cover part and the bottom part may be connected, for example, by welding, gluing, etc. If the flat nozzle according to the invention is of plastic material, it may be manufactured in a single-step injection molding process.

Expediently, the inner chamber of the flat nozzle has a constriction which serves as a flow distributor and which extends centrally from the flow opening to the tubular connecting member. The constriction prevents the flow in the central flow zone from leading; thus, the flow of the fluid from the inner opening of the tubular connecting member into the distributor channel of the flat nozzle is divided and has the same flow velocity in the peripheral zones of the flat nozzle and thus also in the peripheral flow channels of the heat exchanger.

The constriction may be set as a function of the flow velocities in the heat exchange system, while care has to be taken that also in the zone of the highest mid point of the constriction a flow passage for the fluid remains. It is within the scope of the invention to provide a plurality of such constrictions with decreasing height in the cross-sectional course of the flow opening. Such an embodiment is particularly of advantage if a heat exchanger plate of a relatively large width has to be charged with fluid with the aid of a flat nozzle structured according to the invention.

According to an advantageous feature of the invention, the constriction has the smallest inner width in the middle of the flow opening and extends to the root of the tubular connecting member. In this manner, a deflection of the fluid from the central flow direction is effected as early as at the root of the tubular connecting member. The fluid is then is accelerated as the constriction increases towards the peripheral ends of the distributor channel of the flat nozzle.

The deflection of the fluid may also be effected by distributor webs provided in the flow opening of the flat nozzle. One free end of the distributor webs is secured in the inner space of the flat nozzle, while its other free end projects beyond the flow opening. Advantageously, such distributor webs may be curved for changing the direction of the fluid. The effect of such deflecting webs are the same as described earlier in connection with constrictions of the flow cross section of the distributor channel of the flat nozzle.

The advantage of a uniform charging of the flow channels by the heat transferring fluid may also be effected if, in the use of a flat nozzle with parallel walls, the velocity vectors of the fluid at the flow opening of the flat nozzle and the velocity vectors at the inlet into the flow channels do not lie in the same plane, even if these velocity vectors are situated in intersecting planes.

In particular cases, for example, when wide heat exchanger plates or very narrow flow channels are used, at the flow opening of the flat nozzle according to the invention a distributor pipe may be arranged which extends transversely to the flow opening and which is closed at one end and has individual openings oriented in the direction of the flow channels of the heat exchanger. The inner space of the distributor tube is connected with the tubular connecting member with the intermediary of the inner space of the flat nozzle. The distributor tube is expediently connected with the flat nozzle in such a manner that the flat upper side (which may be a requirement for the intended use), is preserved and its load supporting properties maintained. In the downward direction the distributor tube according to the invention may be joined to the bulging protuberance of the flat nozzle because here the particular construction according to the invention may be achieved by embedding the bulging portions in insulating materials, etc. The distributor tube may be connected in a fluidtight manner with the flat nozzle by welding, gluing, etc. Or, such a structure may be manufactured simultaneously with the making of the distributor nozzle in an injection molding process. The distributor tube has the advantage that with each flow channel of the heat exchanger there may be associated a separate opening of the distributor tube. If such passage openings of the distributor tube have the same cross section as the flow channels of the heat exchanger, with this additional arrangement there can be achieved an identical charging of the individual flow channels of the heat exchangers as viewed in the direction of the flow velocity vector. It is to be noted, however, that in this case too, the above-described deflections in the distributor channel of the flat nozzle have to be accounted for to ensure that each flow passage opening of the distributor tube is supplied uniformly with heat transferring fluid already in the inside of the flat nozzle-and-distributor tube combination.

Advantageously, the heat exchanger plate is a one-piece plastic structure manufactured, for example, in an extrusion process. The flat nozzle according to the invention is preferably made of a plastic material too, which is adapted to be welded with the plastic material of the heat exchanger plate. The connection of the ends of the heat exchanger plate with the flat nozzle according to the invention may be so effected that the separating walls of the flow channels in the zone of the location of the flat nozzle are opened or, respectively, cut back in such a manner that the upper and lower cover part of the heat exchanger plate remain preserved. In the heat exchanger chamber thus provided, the flat nozzle is inserted in such a manner that the planar top cover part is connected with the upper plate side and the lower bottom part is connected with the lower plate side. Thereafter, the contacting parts of the heat exchanger plate and the flat nozzle are welded fluidtight to one another by a welding apparatus. This welding step may be performed at the end of a pinch welding operation. When such a plate is used as a heat exchanger, the tubular connecting member is joined by the supply conduit for the fluid and—in case the flat nozzle according to the invention is to be used for the removal of the fluid—the outlet conduit is attached to the oppositely located tubular connecting member. In this manner, the heat transferring fluid may be introduced through the connections and the flat nozzle into the heat exchanger plate and may be removed therefrom by means of the prevailing flow pressure, which is equal with the flow velocity.

DESCRIPTION OF THE PREFERRED EMBODIMENTS

Figure 1:
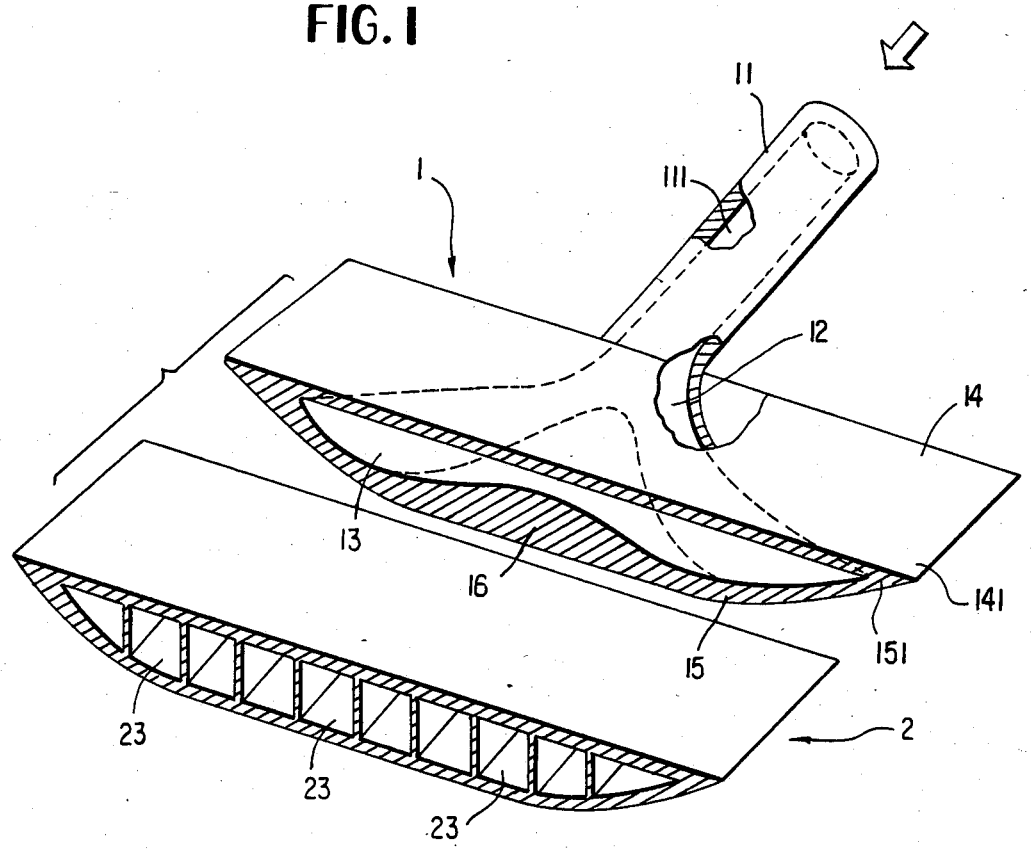
FIG. 1 is a perspective view of a preferred embodiment of the invention, shown partially broken away.
Figure 3:
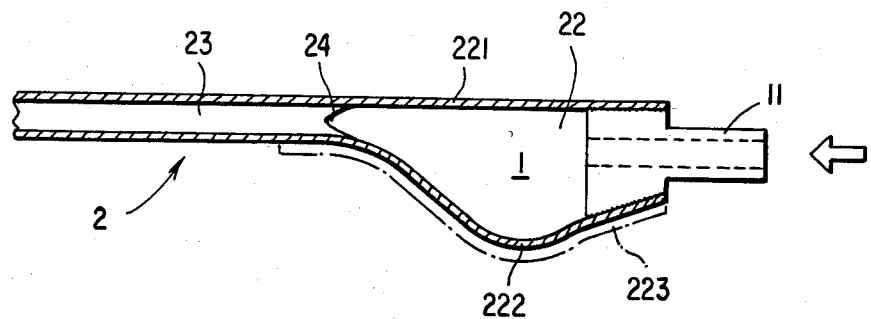
FIG. 3 is a schematic side elevational sectional view of a heat exchanger plate incorporating the invention.

Turning now to FIGS. 1 and 3, there is shown a flat nozzle generally indicated at 1 having a nipple (connecting pipe) 11 which defines an inner tubular conduit (flow passage) 111. The flat nozzle 1 further has an inner space 12 which functions as a distributor channel and into which opens the flow passage 111 of the connecting pipe 11. Opposite the connecting pipe 11 the flat nozzle 1 is provided with an outlet opening 13 which is oriented towards the flow channels 23 of the heat exchanger generally designated at 2. The flat nozzle is formed of a planar top cover 14 and a downwardly bulging bottom part 15. Parts 14 and 15 are connected fluidtight with one another in their end zones 141, 151, respectively. In the mid zone of the outlet opening 13, directly opposite the flow passage cross section 111 of the connecting pipe 11, there is provided a constriction 16 which may extend either unilaterally from the bulging bottom part of the flat nozzle 1 as shown in FIG. 1 or may extend bilaterally, that is, from the planar cover part 14 as well. The constriction 16 narrows towards the middle of the flat nozzle as viewed transversely to the flow direction in the nipple 11 and widens from the opening 13 towards the nipple 11 as viewed parallel to the flow direction in the nipple 11. The constriction 16 has a flow deflecting and flow throttling function.

Figure 2:
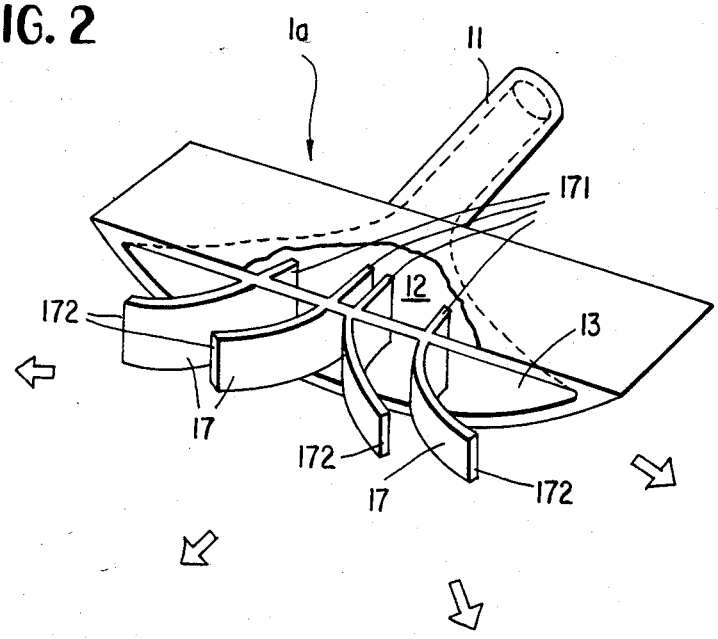
FIG. 2 a is perspective view of another preferred embodiment of the invention.

Turning now to FIG. 2, the embodiment illustrated therein differs from that shown in FIG. 1 in that the flat nozzle generally indicated at 1a is provided with distributor webs 17 instead of a constriction shown in FIG. 1. The distributor webs 17 are arranged in such a manner in the outlet opening 13 that one of their free ends 171 is situated inside the chamber 12 of the flat nozzle, while their outer end 172 projects beyond the outlet opening 13. The distributor webs 171 are curved for deflecting the heat transferring fluid. In addition to a deflecting effect, the webs 171 also have a certain throttling function.

Turning once again to FIG. 3, the flat nozzle 1 of FIG. 1 is received in an inlet chamber 22 of the heat exchanger 2. For this purpose, from the inlet end of the heat exchanger 2, the transverse webs are removed from that part of the heat exchanger which is to the right of location 24, to thus accommodate the flat nozzle 1 between the upper plate 221 and the lower plate 222. The flat nozzle is welded to the plates 221 and 222 of the heat exchanger. The lower closure plate 222 has a bulging configuration to form an additional distributor channel. The bulging configuration may be obtained by deep drawing or by any other conventional thermal deforming process. It is of significance in this connection that such a deforming process is limited to the lower closure plate 222, while the upper closure plate 221 is to be preserved in a planar configuration. Dotted outline 223 shows an external reinforcement for the lower closure plate 222 for better absorbing the pressure prevailing in the inner chamber of the distributor channel.

Figure 4:
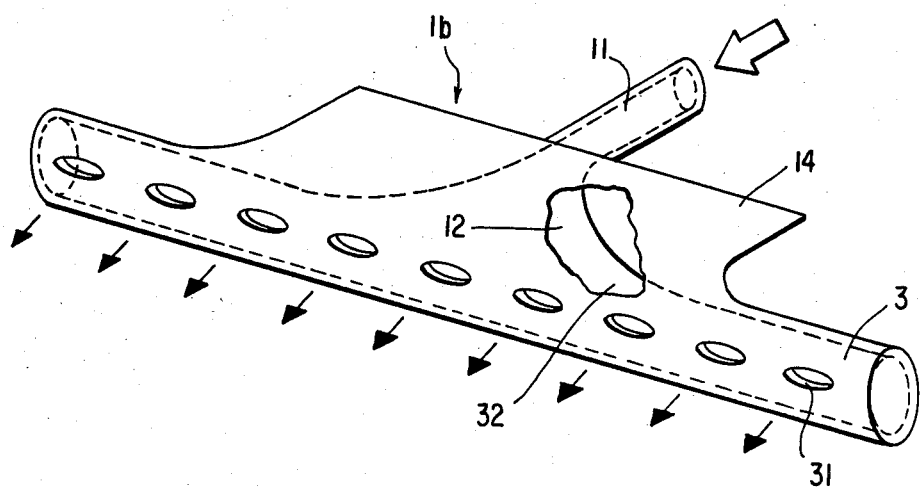
FIG. 4 is a perspective view of a further embodiment of the invention.

Turning now to FIG. 4, to the outlet opening of a nozzle 1b which may be structured similarly to the FIG. 1 embodiment, there is secured a distributor pipe 3 which has a seamless transition into the planar cover part 14 and extends downwardly with its tubular extension from the planar cover part. The distributor pipe 3 has a plurality of serially arranged outlet openings 31 and has an inner space 32 which directly communicates with the inner space 12 of the flat nozzle 1b.

Figure 5:
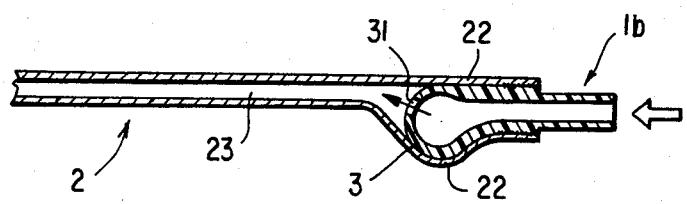
FIG. 5 is a schematic side elevational sectional view of a heat exchanger plate incorporating the preferred embodiment illustrated in FIG. 4.

Turning now to FIG. 5, there is shown the embodiment illustrated in FIG. 4 installed in the inlet chamber 22 of the heat exchanger 2. The distributor pipe 3 of the flat nozzle 1b replaces the additional distributor channel of FIG. 3 (that is, the downward bulge of the lower closure plate 222). Accordingly, the external reinforcement 223 shown in FIG. 3 may be dispensed with.

It will be understood that the above description of the present invention is susceptible to various modifications, changes and adaptations, and the same are intended to be comprehended within the meaning and range of equivalents of the appended claims.

What is claimed is:

1. In a heat exchanger assembly including a plate-shaped heat exchanger formed of a plurality of flow channels each having an upstream and through which heat transferring fluid is introduced for passing through said flow channels in a flow direction; the improvement comprising a flow distributing flat nozzle having
   (a) an inlet end receiving the heat transferring fluid from outside;
   (b) a first, planar cover part substantially lying in a plane parallel to said flow direction and having opposite lateral edges;
   (c) a second cover part having opposite lateral edges bonded fluidtight to the lateral edges of said first cover part; said second cover part extending arcuately between the lateral edges thereof in a direction transverse to said flow direction;
   (d) a distributor chamber being in communication with said inlet end and being defined by inner faces of said first and second cover parts;
   (e) an outlet end constituted by a side of said distributor chamber opposite said inlet end; said outlet end having an elongated shape extending transversely to said flow direction; said outlet end being directly connected to the upstream end of each flow channel, whereby the heat transferring fluid flows from said inlet end of said nozzle into the upstream end of each said flow channel through said distributor chamber and said outlet end; and
   (f) a middle being at equal distance from opposite lateral edges; the distance between the inner faces of said first and second cover parts gradually decreasing towards said middle as viewed in a direction parallel to said first cover part and perpendicular to said flow direction for providing a central flow distributing constriction in said distributor chamber; said constriction extending from said outlet end of said flat nozzle to said inlet end and forming a flow controlling means for transmitting the heat transferring fluid to said outlet end at substantially identical velocities throughout said outlet end.

2. A heat exchanger assembly as defined in claim 1, wherein said constriction is the narrowest in said middle at said outlet end and widens in said middle towards said inlet end.

* * * * *